(12) United States Patent  
Nandagopal et al.

(10) Patent No.: US 8,250,210 B2  
(45) Date of Patent: Aug. 21, 2012

(54) BALANCING USER REGISTRATION LIFETIMES IN A NETWORK

(75) Inventors: Thyaga Nandagopal, Edison, NJ (US); Thomas Woo, Short Hills, NJ (US)

(73) Assignee: Alcatel Lucent, Paris (FR)

( * ) Notice: Subject to any disclaimer, the term of this patent is extended or adjusted under 35 U.S.C. 154(b) by 400 days.

(21) Appl. No.: 12/343,608

(22) Filed: Dec. 24, 2008

(65) Prior Publication Data

US 2010/0161797 A1   Jun. 24, 2010

(51) Int. Cl.  
*G06F 15/173* (2006.01)

(52) U.S. Cl. .................. 709/225; 709/226

(58) Field of Classification Search .......... 709/225, 709/226

See application file for complete search history.

(56) References Cited

U.S. PATENT DOCUMENTS

| | | | |
|---|---|---|---|
| 7,436,848 B1* | 10/2008 | Lewis et al. | 370/462 |
| 2001/0051986 A1* | 12/2001 | Bettis | 709/206 |
| 2007/0298794 A1* | 12/2007 | Cho | 455/435.1 |
| 2008/0071909 A1* | 3/2008 | Young et al. | 709/226 |
| 2008/0076413 A1* | 3/2008 | Jones | 455/432.3 |
| 2009/0076984 A1* | 3/2009 | Guionnet | 705/400 |
| 2010/0161809 A1* | 6/2010 | Roach et al. | 709/227 |

* cited by examiner

*Primary Examiner* — Thomas Dailey  
(74) *Attorney, Agent, or Firm* — Kramer & Amado P.C.

(57) ABSTRACT

A method of balancing user registration lifetimes in a network is disclosed for smoothing the load of the registration server. The method of balancing user registration lifetimes in a network includes providing an initial registration lifetime for a registration request that is calculated using the time of the request and the previous history of registration requests, and in a particular embodiment, using the cumulative distribution function of the history of registration requests. The method of balancing user registration lifetimes in a network is particularly useful for handling spikes in registration traffic, and can accommodate user-specified variable lifetimes, as well dynamic user arrivals and departures. It provides effective load balancing over time for a single server, at the expense of a constant factor additive load per user, which can be amortized to near zero over the long run.

20 Claims, 1 Drawing Sheet

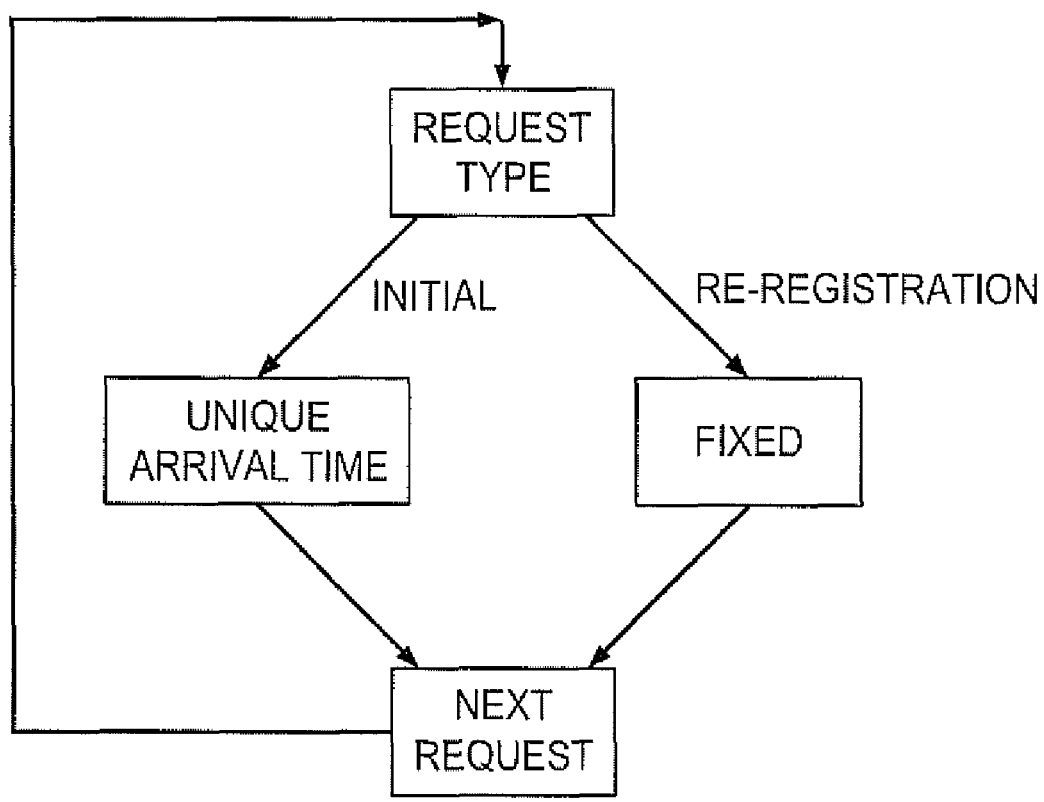

BALANCING USER REGISTRATION LIFETIMES IN A NETWORK

FIELD OF THE INVENTION

The present invention relates to registering new users on a network and is particularly concerned with assigning registration lifetimes so as to balance the load of registration renewals.

BACKGROUND OF THE INVENTION

New users seeking access to a network have to register with the network first. In return, the network grants them a 'lifetime', which describes the period over which the network can be accessed by the user. In turn, users have to periodically renew their registrations with the network before their lifetime expires, if they desire to continue their access. The network has a maximum prescribed lifetime. In order to ensure that users are still present on the network, the network will also request them to periodically re-register, so that it can continue reserving resources for the users. The maximum prescribed lifetime is generally a global setting for all users.

When a large number of users are accessing the network in this manner, the processing of registration requests from these users can create a disproportionally high level of load in the network element/server responsible for processing user registrations. Since the arrivals of these user requests tends to be non-uniform, server load can peak at different times, leading to delays in granting access, or worse, loss of registration requests due to overload conditions. Furthermore, the rate of initial access registration requests is not within the control of the registration server, as initial access requests originate from outside the server.

Therefore, it would be desirable to alleviate the problem of network element/server overload when handling user registrations.

SUMMARY OF THE INVENTION

An object of the present invention is to provide an improved balancing of user registration lifetimes in a network According to an aspect of the present invention there is provided a method for balancing registration server load due to registering and re-registering users on a network having a maximum registration time of a first $T_{max}$, and a previous history of registrations. The method consists of the steps of establishing for a registration request if the request is one of an initial request and a re-registration request; and if the request is an initial request, then assigning an initial registration lifetime which is calculated to generate a uniform distribution of re-registration requests; and if the request is a re-registration request, then assigning a fixed registration lifetime.

Advantages of the present invention include dispersing registration lifetimes over the continually cycling epochs of registration time so that re-registration requests are balanced.

Conveniently the calculation of the initial registration lifetime uses the arrival time of the registration request and the cumulative distribution function of the previous history of registrations. Under at least some embodiments, the fixed registration lifetime is $T_{max}$. Under certain embodiments a second and different $T_{max}$ is associated with particular registration requests.

In accordance with another aspect of the present invention there is provided an article of manufacture for use in programming a registration server to respond to registration requests by registering and re-registering users on a network having a maximum registration time of a first $T_{max}$, and a previous history of registrations. The article of manufacture consists of computer useable media accessible to the registration server. The computer useable media includes at least one computer program that is capable of causing the registration server to perform the steps of establishing for a registration request if the request is one of an initial request and a re-registration request; and then assigning an initial registration lifetime which is calculated to generate a uniform distribution of re-registration requests; and if the request is a re-registration request, then assigning a fixed registration lifetime.

BRIEF DESCRIPTION

FIG. 1 depicts a method for balancing registration server load.

DETAILED DESCRIPTION

While the process of initial access requests is out of control of the server, the server does have an amount of discretion with respect to the lifetime granted to the user. Under an assumption that the current user registration history is representative i.e. that the current history holds true in the future, the server may seek to act to even out the load by assigning a particular lifetime for a user. This particular lifetime is chosen so that when the time comes for this particular user to renew the access registration, the server load will be substantially the same as the server load at any other time instant.

A number of contexts need to be considered for methods balancing user registrations in a network, including:
  a) When there is no constraint on the user lifetimes;
  b) When the user lifetimes cannot be greater that the lifetime requested by the user;
     i. Long term load balancing—evens out over a period of the maximum possible user lifetime, but does not address short-term load imbalances
     ii. Short term intra-epoch load balancing—addresses load-balancing over the short-term, assuming loads over the various periods/epochs are roughly the same.
     iii. Inter-epoch short-term load balancing—a composite method that considers the loads of various future epochs when it tries to balance the load over a short-term.
  c) When the user set is dynamically changing, i.e., some users leave the system and others join the system.

Any balancing scheme is going to increase the total server load to a certain extent. What is desired is an approach that provides some explicit bounds on this additional load on the server which comes at the expense of perfect balancing. Further, it is useful to minimize the additional total server load which is providing load balancing. Notice that the contexts identified in items (b) and (c) above are even more complex with the constraints on user lifetimes, and a dynamically changing user set.

The Case where Users do Not Request Lifetimes—Static Set of Users

Consider the situation where the set of users is the same, and where users do not request any specific lifetimes when registering with the network. In other words, the maximum lifetime a user can be granted is the network's maximum lifetime, denoted by $T_{max}$. Let the total number of users in the system be N.

Divide the time into epochs, where each epoch is of duration $T_{max}$. Consider the upcoming epoch. All N users register at least once in this epoch. In this situation, the ideal way to minimize number of registrations is to assign lifetimes of $T_{max}$ to all the users. However, the processing load needs to be distributed in time.

Based on the current set of registrations (and the assigned lifetimes), the network can predict when the users are going to register next, and thus predict the load on the system in the next epoch from $[t, t+T_{max})$. Let $n(t)$ be the number of users expected to register at time 't'. Then the fraction of users registering at time 't' is given by $n(t)/N$.

Let $X(t)$ denote a random variable that indicates the fraction of users registering at time t. Assuming that time is discrete, $n(t)/N$ denotes the probability mass function $f(x)$ of the distribution of expected load (normalized with respect to he number of users).

Denote epoch $E_i = [t_i, t_i+T_{max})$. Notice that the interval is half-open at the end point. The cumulative distribution function, or cdf, of $X(t)$ over a given epoch $E_i = [t_i, t_i+T_{max})$ is given by $$cdf(t) = \sum_{t' \geq t_i}^{t} \frac{n(t')}{N}.$$

Note that $cdf(t_i+T_{max})=1$

There is a need to distinguish between new users and users which are re-registering at the end of their assigned lifetime. For each user 'u', have a Boolean variable balanced(u), which is set to 'false' for new users. The balancing scheme is not applied for users for whom balanced(u) is set to 'true'.

Method 1

For each user 'u' renewing at time 't' within epoch E, the following method is applied:

```
if balanced(u) = false,
   then
      its next lifetime l_u = ((t_i + T_max - t) + cdf(t) * T_max) modulo T_max,
      balanced(u) = true.
else if balanced(u) = true,
   then
      its next lifetime l_u = T_max.
```

This method is based on the conversion of a random probability distribution into a uniform distribution, which is our desired outcome. In order to convert any random probability distribution $f(x)$ into an uniform distribution on $[0,1]$, one simply takes the cdf as the transformation $y=cdf(x)$ with the pdf $g(y)$. This is a well-known mathematically, based on the fact that $$g(y)=f(x)/|d(y)/d(x)|,$$

and that $$d(y)/d(x)=f(x).$$

When the user set is static and N is known a priori, all users will initially have balanced(u)=false, and the balancing method shown in Method 1 places these users in the correct position such that they are balanced in an uniform distribution. Once placed such, these users will always have the same positions in the subsequent epochs, since their lifetimes now will become $T_{max}$.

Accommodating Traffic Spikes

As described above, the method is very efficient in mapping out any load distribution into a uniform load distribution, under the assumption that the load distribution function (i.e. $f(x)$) is continuous and differentiable. This assumption will be violated when there are traffic spikes resulting in a drastic net change in the number of registrations at a given time instant (i.e., when a bunch of users re-register with the network at an identical time, or de-register at the exact same time). Under the assumption that time is discrete in our network model, the above method falls short. This may be accommodated by adopting the following changes to Method 1.

Define t' as the largest time instant, smaller than t, when a user registration is processed. Any registration request that arrives at the server is enqueued. If more than one user registration occurs at time instant t, then these requests are first queued in the order they were received (i.e., in any order since they are received at exactly the same time instant, t). However, as depicted in FIG. 1, the arrival time of a request that is next in the queue is modified to be the time instant at which processing the previous registration request is finished, if the registration queue is non-empty at that instant. When this procedure is applied to all requests that have been queued, it is ensured that not more than one registration process has the same arrival time, thereby eliminating the traffic spike problem observed before.

Introduce a new Boolean variable, queued(u), that has a value of true if the registration request of user u has been waiting in the queue prior to obtaining service. The system also has a global variable last_registration that records the time instant at which the last known registration request was processed.

Method 2—Accommodating Traffic Spikes:

The following method is applied:

```
cdf(t_i) = 0 at the beginning of each epoch E_i
t'' = t_i
repeat until current time, t = t_i + T_max
   if server_status = idle & there are user requests in the queue
      server_status = busy
      select a request, u = user id of the registration request
      t = current time
      cdf(t) = cdf(t') + 1/N
      if balanced(u) = false,
         next lifetime, l_u = ((t_i + T_max - t) + cdf(t) * T_max) modulo T_max,
         balanced(u) = true.
      else (i.e., balanced(u) = true)
         next lifetime l_u = T_max
      t' = t
   server_status = idle
end repeat loop
```

Consider the load balancing produced by Method 2 described above, as well as the extra load created by the load-balancing process. The modified cumulative distribution function, cdf(t), in Method 2 is a valid cdf for the modified arrival process described earlier in this section. Since the method utilizes the well-known distribution mapping property, the resultant distribution of lifetimes results in a uniform load on the system in the next epoch. This is easy to see since the total users N is a constant.

In terms of the additional load, this balancing operation is done once for each user in the network. This implies that each user can have a lifetime smaller than $T_{max}$ at most once across multiple epochs, and this lifetime can be in the interval $(0, T_{max})$. Thus, each user will register at most twice before finding their right position in the load-balanced assignment. Thus, the network registration server(s) will have to process the N users at most one additional time than the case with no load-balancing. This is a relatively very low cost to be incurred given the benefits of load-balancing.

Note that in a real system, due to clock skew/drift, the registrations from users may not occur at the precise moments predicted by the system based on the assigned lifetimes. In such cases, over a period of time, the load may get unbalanced. In such instances, the system can reset the load-balancing method by setting the balanced(u) variable to false for all users in the system, thereby forcing a fresh load-balancing operation.

Note again that this method is used to balance the load on an individual server on a temporal basis. It is not used for balancing load across multiple servers. On another note, some registration requests may be rejected due to invalid message formats or some other reasons. In such cases, these are not repeating events, i.e., these are not periodic with time. Therefore, such events may be ignored as one-off events when calculating the load on the server.

The Case where Users do Not Request Lifetimes—Dynamic Set of Users

When the set of users keep changing, it is because of a combination of two reasons: (a) new users join the system; and (b) existing users leave the system. Define existing users as those carried over from the previous epoch. Both of these factors are unpredictable to a certain extent (unless some form of profiling is used—which is probabilistic in nature). If these events can be predicted, then the total number of users, N, in an epoch $E_i$ can be adjusted based on the prediction. Therefore, the concern is with the scenarios where these events cannot be predicted.

Of the two types of events, the case when existing users leave the system is of less concern to the system, since it only serves to lighten the load at a given time. Once the epoch is over, the server counts the number of users, N, who remain in the system, and rebalances the lifetimes over the next epoch based on Method 2.

Now, consider the case when new users join the system. It cannot be predicted when and how many users join the system in the present epoch. This implies that it is not possible to correctly predict the total number of users in the current epoch. In order to get over this problem, the method differentiates between existing users (whose number is known), and users registering for the first time in the current epoch (whose number is unknown). For existing users, load balancing is done based on Method 2. Let the balanced load level be x users per time interval (e.g., users per second) for N existing users. For new users, the number of re-registrations in each time interval (e.g. 1-second intervals) in the next epoch should be roughly the same. In other words, if there are N existing users and M new users in the current epoch, then the number of number of registrations per second from M+N users in the next epoch should not exceed $x+M/T_{max}$.

Following is a description of the combined method for balancing users when their number changes dynamically over time. The number of existing users in the current epoch is tracked using $N_{current}$, and the number of existing users (predicted to re-register) in the next epoch as $N_{next}$. The balanced (u) variable is modified to be an integer, and a new possible value for this variable—false-new is added, to denote that the new user is not even balanced.

Method 3—Accommodating Traffic Spikes and Dynamic User Set

The following method is applied:

$cdf(t_i) = 0$ at the beginning of each epoch $E_i = [t_i, t_i + T_{max})$
new_user_slot = 0
t' = $t_i$
$N_{next} = N_{current}$
repeat until current time, t = $t_i + T_{max}$ -continued

```
if server_status = idle & there are user requests in the queue
    server_status = busy
    select a request, u = user id of the registration request
    t = current time
    cdf(t) = cdf(t') + 1/N_current
    if registration_type = de-register
        N_next = N_next − 1
    else if registration_type = new-user
        lifetime, l(u) = (t_i + T_max −t) + new_user_slot) modulo T_max
        new_user_slot = (new_user_slot + 1) modulo T_max
        if t + l(u) < t_i + T_max
            balanced(u) = false-new
        else
            balanced(u) = false
        N_next = N_next + 1
    else (Re-registration from existing user)
        if balanced(u) = false,
            lifetime, l_u = ((t_i + T_max −t) + cdf(t) * T_max) modulo T_max,
            balanced(u) = true.
        else if balanced(u) = false-new,
            lifetime, l_u = T_max
            balanced(u) = false.
        else if balanced(u) = true
            lifetime l_u = T_max
    t' = t
    server_status = idle
end repeat loop
N_current = N_next (for use in the next epoch)
```

Now, consider the load balancing produced by Method 3 described above, as well as the extra load created by the load-balancing process. From Method 2, it is known that the arrival process for existing users is balanced out evenly. By reducing the existing user count for departing users, it is also ensured that the arrival process for the remaining existing users is balanced in the next epoch. Now, focus on the new arrivals. It is ensured that if M new users arrive in a given epoch, then in the next epoch, there are at least $\lfloor M/T_{max} \rfloor$ new users per second, and there are at most $\lceil M/T_{max} \rceil$ new users per second. At the same time, it is also ensured that new users do not get a lifetime of more than $T_{max}$. The trade-off here is that it might be four registration cycles before a new user is balanced, compared to two registration cycles for an existing user. In other words, instead of one registration per epoch, a new user may have to register up to twice in the first epoch in which it registers, and up to twice in the next epoch as well.

This implies that for each user in the network, the network registration server(s) will have to process at most three additional registration messages when compared to the case with no load-balancing. This is relatively very low cost to be incurred given the benefits of load-balancing over a large number of epochs.

Users Request Lifetimes—Dynamic Set of Users

In some network types, such as a Mobile IP network, the users request a lifetime from the network, and the network has to grant them a lifetime not exceeding this user-requested lifetime. The network also has a maximum lifetime, $T_{max}$, which can be granted to users. This complicates the issue of load-balancing further, since in an epoch of size $T_{max}$, there can be multiple registrations by a single user. In order to spread the load across an epoch, it is necessary to figure out the multiple lifetimes possible for a user within a single epoch. This will increase the states in the system by a significant factor, depending on the lifetimes requested by the user.

The other alternative is to consider the smallest possible user-requested lifetime as the size of the epoch. However, in this case, existing users will not all register in any given epoch, and it will be necessary to distribute the load simultaneously across multiple epochs, each with a different number of users. The earlier methods are not usable in these cases.

Consider the use of Method 3 for addressing this case. In a Mobile IP network, for example, user-configured maximum lifetimes are present, but instead of spanning all possible values from 0 to $T_{max}$, there are only a few distinct lifetime values configured for a user. For each configured user maximum lifetime value, there are many users who have this value. If we keep the network load balanced across these users, and repeat this for each distinct max lifetime value, the total network load will be balanced. This relies on the fact that the number of users with each configured max lifetime is far greater than $T_{max}$ (in seconds).

For each distinct maximum lifetime $T_{max}(u)$ requested by user u, we have a separate instance of Method 3. The epochs for this instance are of length $T_{max}(u)$, $N_{current}(T_{max}(u))$ and $N_{next}(T_{max}(u))$ are the number of existing users with the same configured max lifetime in the current epoch and next epoch. Denote $t''=T_{max}(u)$ in the following discussion.

Method 4—Accommodating Traffic Spikes and Dynamic User Set with User-Requested Maximum Life Times For each distinct value of $T_{max}$ assigned to users, we have a time-data structure composed of cdf(t), $E_i$, t, new_user_slot, $N_{next}$, $N_{current}$. We index each data structure by the subscript k. The global variable common to all these time-data structures is server-status.

The following method is applied:

```
update_variables( )
    For each data structure indexed by k
        at the beginning of each epoch E_{i k} = [t_{i k}, t_{i k} + T_{max k})
            cdf_k(t_{,i}) = 0
            new_user_slot_k = 0
            t'_k = t_{i k}
            if (current_time = 0) (i.e., no users in the very beginning)
                N_{current k} = 0 (all users will be new)
                N_{next k} = 0
            N_{current k} = N_{next k}
repeat
    if server_status = idle & there are user requests in the queue
        server_status = busy
        update_variables( )
        select a request, u = user id of the registration request
        k = index of data structure corresponding to T_{max(u)} in the request
        t_k = current time
        if registration_type = new-user
            lifetime, l(u) = (t_{i k} + T_{max,k} − t_k) + new_user_slot_k) modulo T_{max,k}
            new_user_slot_k = (new_user_slot_k + 1) modulo T_{max,k}
            if t_k + l(u) < t_{i k} + T_{max,k}
                balanced(u) = false-new
            else
                balanced(u) = false
            N_{next k} = N_{next k} + 1
        else
            cdf_k(t) = cdf_k(t') + 1/N_{current k}
            if registration_type = de-register
                N_{next k} = N_{next k} − 1
            else (Re-registration from existing user)
                if balanced(u) = false,
                    lifetime, l_u = ((t_{i k} + T_{max,k} − t_k) + cdf_k(t) * T_{max,k}) modulo T_{max,k},
                    balanced(u) = true.
                else if balanced(u) = false-new,
                    lifetime, l_u = T_{max,k}
                    balanced(u) = false.
                else if balanced(u) = true
                    lifetime l_u = T_{max,k}
        t'_k = t_k
        server_status = idle
end repeat loop
```

Method 4 balances users with the same values of $T_{max}(u)$. Let there by m distinct values of $T_{max}(u)$ configured among all users. For each k, let $z_k$ the number of users with the $T_{max}(u)$ =k. Once these users are balanced using our method, we have between $\lfloor z_k/T_{max,k} \rfloor$ and $\lceil z_k/T_{max,k} \rceil$ users per second. Summing up over all 'k', we have between $$\sum_k \lfloor z_k / T_{max,k} \rfloor \text{ and } \sum_k \lceil z_k / T_{max,k} \rceil$$

users per second. Since newly arriving users are also balanced, this also leads to an additional discrepancy of at most one user per second for each distinct k. This leads to a worst-case discrepancy of at most 2m users per second in the load at various 1-second intervals.

Therefore, what has been disclosed are methods to achieve even load balancing of the server load on a single server across time. The method takes into account traffic spikes, dynamic user arrivals and departures, and also the fact that users might request their own maximum lifetimes. It provides perfect load balancing over time for a single server, at the expense of a constant factor additive load per user, which can be amortized to near zero over the long run.

Numerous modifications, variations and adaptations may be made to the particular embodiments of the invention described above without departing from the scope of the invention, which is defined in the claims.

What is claimed is:

1. A method for balancing registration server load due to registering and re-registering users on a network having a maximum registration time of a first $T_{max}$, and a previous history of registrations, said method comprising:
   distinguishing by a server, for each registration request, between an initial request of a new user and a re-registration request of an existing user;
   if the request is the initial request of the new user, then creating an initial registration lifetime so that all registration requests of new users have different arrival time values; and
   if the request is the re-registration request of the existing user, then assigning a fixed registration lifetime.

2. The method as claimed in claim 1, further comprising:
   calculating the initial registration lifetime using the arrival time value of the registration request and a cumulative distribution function of the previous history of registrations.

3. The method as claimed in claim 1, wherein said fixed registration lifetime is the first $T_{max}$.

4. The method as claimed in claim 2, wherein said fixed registration lifetime is the first $T_{max}$.

5. The method as claimed in claim 2, further comprising:
   performing enqueuing of simultaneous registration requests; and
   performing de-queuing of registration requests, wherein the calculating step further incorporates an amount of time the request has been enqueued.

6. The method as claimed in claim 5, further comprising:
   treating re-registration requests of existing users as initial registration requests of new users for a set period of time.

7. The method as claimed in claim 6, wherein said set period of time is equal to the first $T_{max}$.

8. The method as claimed in claim 4, further comprising:
   associating a second $T_{max}$, with particular registration requests.

9. A non-transitory article of manufacture for use in programming a registration server to respond to registration requests by registering and re-registering users on a network having a maximum registration time of a first $T_{max}$, and a previous history of registrations, the article of manufacture comprising computer useable media accessible to the registration server, wherein the computer useable media include at least one computer program that is capable of causing the registration server to perform:

distinguishing, for each registration request, between an initial request of a new user and a re-registration request of an existing user;

if the request is the initial request of the new user, then creating an initial registration lifetime so that all registration requests of new users have different arrival time values; and if the request is the re-registration request of the existing user, then assigning a fixed registration lifetime.

10. The non-transitory article of manufacture as claimed in claim 9, further comprising:

calculating the initial registration lifetime using the arrival time value of the registration request and the cumulative distribution function of the previous history of registrations.

11. The non-transitory article of manufacture as claimed in claim 9, wherein said fixed registration lifetime is the first $T_{max}$.

12. The non-transitory article of manufacture as claimed in claim 10, wherein said fixed registration lifetime is the first $T_{max}$.

13. The non-transitory article of manufacture as claimed in claim 10, further comprising:

performing enqueuing of simultaneous registration requests; and performing de-queuing of registration requests, wherein the calculating step further incorporates the amount of time the request has been enqueued.

14. The non-transitory article of manufacture as claimed in claim 12, further comprising:

treating re-registration requests of existing users as initial registration requests of new users for a set period of time.

15. The non-transitory article of manufacture as claimed in claim 13, wherein said set period of time is equal to the first $T_{max}$.

16. The non-transitory article of manufacture as claimed in claim 13, further comprising:

associating a second $T_{max}$ with particular registration requests.

17. The method of claim 1, further comprising:
determining multiple lifetimes possible for each user within a single epoch.

18. The method of claim 1, further comprising:
setting a smallest possible user-requested lifetime as a size of a corresponding epoch.

19. The method of claim 1, further comprising:
configuring distinct lifetime values for each user.

20. The method of claim 1, further comprising:
after an epoch ends, counting a number of users and rebalancing registration lifetimes for a subsequent epoch based upon the number of users.

* * * * *